(12) United States Patent
Ryu et al.

(10) Patent No.: US 11,620,555 B2
(45) Date of Patent: Apr. 4, 2023

(54) METHOD AND APPARATUS FOR STOCHASTIC INFERENCE BETWEEN MULTIPLE RANDOM VARIABLES VIA COMMON REPRESENTATION

(71) Applicant: Samsung Electronics Co., Ltd., Gyeonggi-do (KR)

(72) Inventors: Jongha Ryu, La Jolla, CA (US); Yoo Jin Choi, San Diego, CA (US); Mostafa El-Khamy, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 328 days.

(21) Appl. No.: 16/373,913

(22) Filed: Apr. 3, 2019

(65) Prior Publication Data

US 2020/0134499 A1 Apr. 30, 2020

Related U.S. Application Data

(60) Provisional application No. 62/751,108, filed on Oct. 26, 2018.

(51) Int. Cl.
*G06N 7/00* (2006.01)
*G06N 20/00* (2019.01)
*G06N 5/04* (2006.01)

(52) U.S. Cl.
CPC ............. *G06N 7/005* (2013.01); *G06N 20/00* (2019.01); *G06N 5/04* (2013.01)

(58) Field of Classification Search
CPC ...... G06N 7/005; G06N 20/00; G06N 3/0454; G06N 3/088; G06N 3/0472; G06N 3/063; G06N 3/08; G06N 5/04

USPC .......................................................... 706/12
See application file for complete search history.

(56) References Cited

U.S. PATENT DOCUMENTS

| | | | |
|---|---|---|---|
| 2009/0062594 | A1 | 2/2009 | Li et al. |
| 2012/0303562 | A1 | 11/2012 | Paguio |
| 2014/0188780 | A1 | 7/2014 | Guo et al. |
| 2014/0229158 | A1 | 8/2014 | Zweig et al. |
| 2015/0213361 | A1 | 7/2015 | Gamon et al. |

(Continued)

FOREIGN PATENT DOCUMENTS

| | | | |
|---|---|---|---|
| CN | 106156067 | | 11/2016 |
| JP | 6099099 | B2 * | 3/2017 |

(Continued)

OTHER PUBLICATIONS

Wang, Weiran, et al. "Deep variational canonical correlation analysis." arXiv preprint arXiv:1610.03454 (2016). (Year: 2016).*

(Continued)

*Primary Examiner* — Michael J Huntley
*Assistant Examiner* — Sehwan Kim
(74) *Attorney, Agent, or Firm* — The Farrell Law Firm, P.C.

(57) ABSTRACT

A method and system are herein disclosed. The method includes developing a joint latent variable model having a first variable, a second variable, and a joint latent variable representing common information between the first and second variables, generating a variational posterior of the joint latent variable model, training the variational posterior, and performing inference of the first variable from the second variable based on the variational posterior.

14 Claims, 11 Drawing Sheets

(56) References Cited

U.S. PATENT DOCUMENTS

| | | | |
|---|---|---|---|
| 2017/0039478 A1 | 2/2017 | Campbell et al. | |
| 2017/0188862 A1 | 7/2017 | Kale et al. | |
| 2018/0082172 A1 | 3/2018 | Patel et al. | |
| 2019/0036795 A1* | 1/2019 | Ouyang | H04L 43/14 |
| 2020/0401916 A1* | 12/2020 | Rolfe | G06N 5/04 |

FOREIGN PATENT DOCUMENTS

| | | | |
|---|---|---|---|
| KR | 102070049 B1 * | 4/2020 | |
| KR | 20200047272 A * | 5/2020 | |
| WO | WO 2018/211143 | 11/2018 | |

OTHER PUBLICATIONS

Kingma, Diederik P., and Max Welling. "Auto-encoding variational bayes." arXiv preprint arXiv:1312.6114 (2013). (Year: 2013).*

Yoshua Bengio et al., "Representation learning: A review and new perspectives." IEEE transactions on pattern analysis and machine intelligence 35.8 (2013): 1798-1828.

Diederik P. et al., "Auto-encoding variational bayes." arXiv preprint arXiv:1312.6114 (2013), pp. 14.

Alec Radford et al., "Unsupervised representation learning with deep convolutional generative adversarial networks." arXiv preprint arXiv:1511.06434 (2015), pp. 16.

Ramakrishna Vedantam et al., "Generative models of visually grounded imagination." arXiv preprint arXiv:1705.10762 (2017), pp. 21.

Weiran Wang et al., "Deep variational canonical correlation analysis." arXiv preprint arXiv:1610.03454 (2016), pp. 13.

Kihyuk Sohn et al., "Learning structured output representation using deep conditional generative models." Advances in Neural Information Processing Systems. 2015, pp. 9.

Rui Shu et al., "Bottleneck conditional density estimation." arXiv preprint arXiv:1611.08568 (2016), pp. 9.

Suzuki et al., "Joint multimodal learning with deep generative models," ICLR Workshop 2017, pp. 12.

Alexander A. Alemi et al.. Deep variational information bottleneck. In Proc. Int. Conf. Learn. Repr., 2017, pp. 19.

Diederik P Kingma et al., Semi-supervised learning with deep generative models. pp. 3581-3589, 2014.

Naftali Tishby et al., The information bottleneck method. pp. 368-377, 1999.

Aaron Wyner. The common information of two dependent random variables. IEEE Transactions on Information Theory, 21(2):163-179, 1975.

Taiwanese Office Action dated Feb. 1, 2023 issued in counterpart application No. 108138375, 8 pages.

* cited by examiner

METHOD AND APPARATUS FOR STOCHASTIC INFERENCE BETWEEN MULTIPLE RANDOM VARIABLES VIA COMMON REPRESENTATION

PRIORITY

This application is based on and claims priority under 35 U.S.C. § 119(e) to a U.S. Provisional Patent Application filed on Oct. 26, 2018 in the United States Patent and Trademark Office and assigned Ser. No. 62/751,108, the entire contents of which are incorporated herein by reference.

FIELD

The present disclosure relates generally to neural networks. In particular, the present disclosure relates to a method and apparatus for stochastic inference between multiple random variables via common representation.

BACKGROUND

Inference by learning stochastic representations is one of the promising research areas in machine learning. A goal in this research area is to simulate the underlying source by learning a distribution from observed data, which is known as the "generation problem." In recent years, there have been proposed generative models based on deep neural networks including approximate probabilistic inference based on variational methods and generative adversarial networks.

SUMMARY

According to one embodiment, a method is provided. The method includes developing a joint latent variable model having a first variable, a second variable, and a joint latent variable representing common information between the first and second variables, generating a variational posterior of the joint latent variable model, training the variational posterior, and performing inference of the first variable from the second variable based on the variational posterior.

According to one embodiment, a system is provided. The system includes at least one decoder, at least one encoder, and a processor configured to develop a joint latent variable model having a first variable, a second variable, and a joint latent variable representing common information between the first and second variables, generate a variational posterior of the joint latent variable model, train the variational posterior, perform inference of the first variable from the second variable based on the variational posterior.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
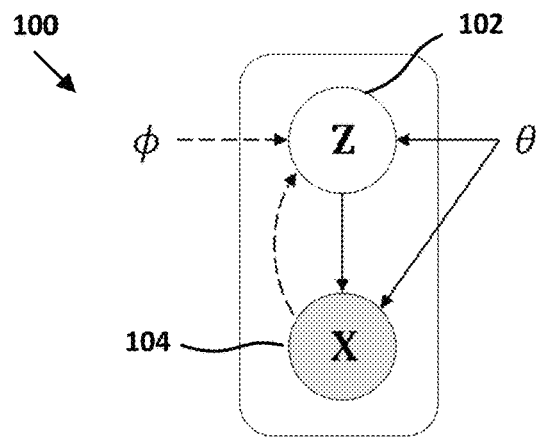
FIGS. 1, 2 and 3 are diagrams of latent models, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

FIG. 1 is a diagram of a latent variable model 100, according to an embodiment. Z 102 represents $p_\theta(z)$ and X 104 represents $p_{data}(x)$. A goal in probabilistic inference is to learn a data distribution $p_{data}(x)$ from its samples $\{X\}_{i=1}^N$. It may be difficult to directly find a parameter $\theta$ such that $p_\theta(x)$ well approximates $p_{data}(x)$ given a parametric family of distributions $\{p_\theta(x): \theta \in \Theta\}$. Thus, one approach is to introduce a latent variable $\varphi$ as depicted in FIG. 1 as a relaxed problem. Table 1 shows various terms and definitions for reference, although the terms are not limited to the definitions presented in Table 1.

TABLE 1

| Probability | Name | Nickname | Parameterization in VAE | Notes |
|---|---|---|---|---|
| $p_\theta(z)$ | (Latent) prior | — | $\mathcal{N}(0, I)$ | — |
| $p_\theta(x\|z)$ | Likelihood | Decoder, or generation network | $\mathcal{N}(\mu(z), \sigma^2(z) \odot I)$ or $\text{Bern}(\mu(z))$ | — |
| $p_\theta(z\|x)$ | Model posterior | — | — | Intractable |
| $p_\phi(z\|x)$ | Approximate posterior | Variational encoder, or recognition network | $\mathcal{N}(\mu(x), \sigma^2(x) \odot I)$ | — |

Usually, $p_\theta(z)$ is a fixed prior distribution, such as the standard normal distribution. Assuming this model, the joint distribution may be characterized by the latent variable model $p_\theta(z)p_\theta(x|z)$ to satisfy that $p_{data}(x) \approx p_\theta(x) := \int p_\theta(z) p_\theta(x|z) dz$. This can be formulized as in Equation (1).

$$\min_\theta \cdot D(p_{data}(x) \| p_\theta(x)) \tag{1}$$

Equation (1) is equivalent to solving the maximum likelihood estimation as in Equation (2).

$$\max_\theta \cdot \sum_{i=1}^N \log p_\theta(X^{(i)}) \tag{2}$$

However, the marginal density $p_\theta(x)$ is in general hard to find due to the integration. To resolve this issue, the variational methods introduce a variational distribution $q_\phi(z|x)$ as an approximation of the true posterior $p_\theta(z|x)$. With this, a variational upper bound for the log-loss can be derived, as in Equation (3).

$$-\log p_\theta(x) \le E_{q_\phi(z|x)}\left[\log \frac{1}{p_\theta(x|Z)}\right] + D(q_\phi(z|x) \| p_\theta(z)) := \mathcal{L}(x; \theta, \phi) \tag{3}$$

In Equation (3), the term $D(q_\phi(z|x) \| p_\theta(z))$ acts as a regularization term, while the term $$E_{q_\phi(z|x)}\left[\log \frac{1}{p_\theta(x|Z)}\right]$$

can be interpreted as a reconstruction log loss. The true risk of the loss function is given as Equation (4).

$$R(\theta, \phi) := E_{p_{data}(x)}[\mathcal{L}(x;\theta,\phi)] = h(p_{data}(x)) + \tag{4}$$

$$D(p_{data}(x) q_\phi(z|x) \| p_\theta(z) p_\theta(z|x))$$

In Equation (4), h(p) denotes the differential entropy of the density p. Further, Equation (5) is to be noted.

$$E_{p_{data}(x)}\left[\log \frac{1}{p_\theta(X)}\right] = h(p_{data}(x)) + D(p_{data}(x) \| p_\theta(x)) \le R(\theta, \phi) \tag{5}$$

Therefore, for variational learning (e.g., minimizing the risk $R(\theta,\phi)$), from Equation (5), it is a relaxed optimization problem for the maximum likelihood estimation in Equation (2), and from Equation (4), it is equivalent to solving the relaxed joint distribution matching problem as in Equation (6):

$$\min_{\theta,\phi} D(p_{data}(x) q_\phi(z|x) \| p_\theta(z) p_\theta(x|z)) \tag{6}$$

Instead of directly solving a marginal distribution matching problem as in Equation (1). As described herein, $\theta$ denotes the parameter of an underlying latent model, and $\phi$ denotes the parameter of a variational posterior. If there are multiple variational posteriors in the same model, the corresponding conditioning variables are presented in the subscript of parameter $\phi$ (e.g., $\phi_x$, $\phi_{x,y}$, etc.)

Figure 2:
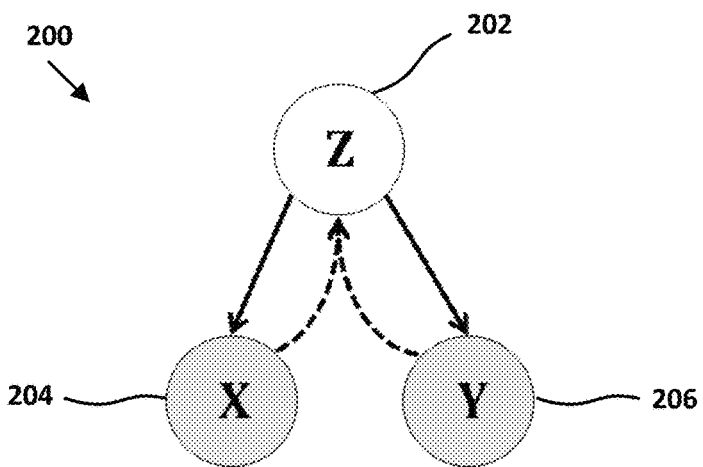
Figure 3:
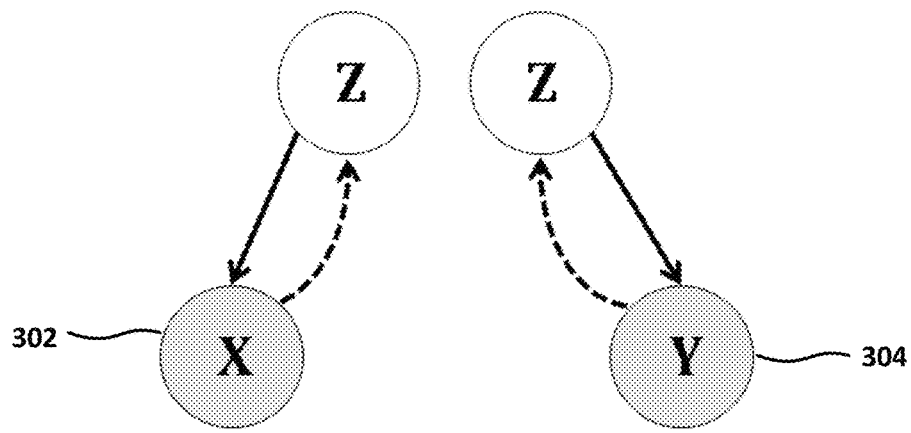

FIGS. 2 and 3 are diagrams of variable models, according to an embodiment. Model 200 depicts the whole latent variable model $p_\theta(z)p_\theta(x|z)p_\theta(y|z)$, where Z 202 represents $p_\theta(z)$, X 204 represents $p_{data}(x)$ and Y 206 represents $p_{data}(y)$. Model 302 is a partial latent variable model $p_\theta(z)$ $p_\theta(x|z)$ of model 200 and model 304 is a partial latent variable model $p_\theta(z)p_\theta(y|z)$ of model 200.

For most of parametric distributions, the regularization term $D(q_\phi(z|x)\|p_\theta(z))$ can be computed analytically only with the parameters of the distributions, which are determined by differentiable mappings of $\theta,\phi$. A challenge arises when attempting to take derivatives of the reconstruction error. The derivative can be approximated by a simple Monte-Carlo approximation as Equation (7):

$$E_{q_\phi(z|x)}\left[\log\frac{1}{p_\theta(x|Z)}\right] \approx \frac{1}{L}\sum_{l=1}^{L}\log\frac{1}{p_\theta(x|z^l)}; z^l \sim q_\phi(z|x) \quad (7)$$

where L is the number of samples taken for approximation. The non-differentiable sampling procedure $z^l \sim q_\phi(z|x)$ prohibits the optimization procedure. To avoid this issue, a reparameterization trick is introduced of which the key idea is that $z^l \sim q_\phi(z|x)$ can be sampled through $z^l = g_\phi(x|\in)$, where $g_\phi$ is a differentiable deterministic mapping and $\in \sim p(\in)$ is an auxiliary random variable which is supposedly easy to be sampled.

The variational learning with tractable parameterization of distributions with deep neural networks based on the reparameterization trick is also referred to as auto-encoding variational Bayes (AEVB).

Figure 4:
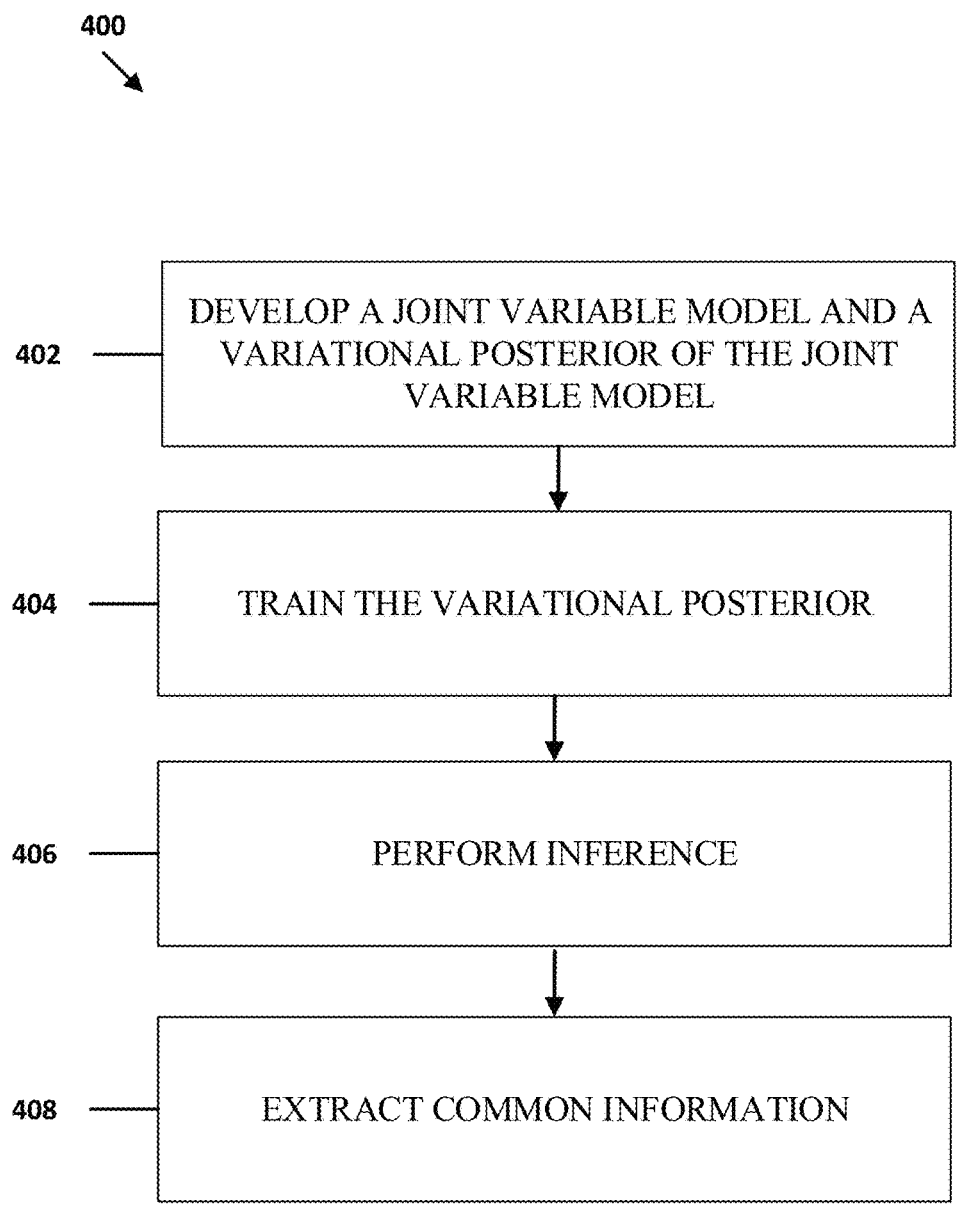
FIG. 4 is a flowchart of a method for performing inference, according to an embodiment.

FIG. 4 is a flowchart 400 for performing variational inference via common representation, according to an embodiment. Given a paired data $\{(X^i,Y^i)\}_{i=1}^{N}$, a statistical relationship between X and Y is sought to be learned. Although the embodiment described herein utilizes two variables, the model can be extended to multiple variables as will be apparent to those of skill in the art on the bases of the disclosure herein. Multi-way inference, or inference in both ways from X to Y and Y to X, is performed by learning $p_{data}(x|y)$ and $p_{data}(y|x)$. Thus, the system trains a joint latent variable model $p_\theta(z)p_\theta(x|z)p_\theta(y|z)$ and then performs inference via the common representation Z. Z represents a joint representation of X and Y, which contains enough information of both X and Y to ensure the conditional independence $X \perp\!\!\!\perp Y|Z$. Hence, given any observation, guessing Z correctly should be enough for inference to any, variable X or Y.

At 402, the system develops a joint latent variable model and a variational posterior of the joint variable model. To infer Y based on the observation $\{X=x\}$, and with access to the model posterior $p_\theta(z|x)$, a sampling procedure of Y from $p_{data}(y|x)$ can be approximated by sampling $z^{(0)} \sim p_\theta(z|x)$ and sampling $y^{(0)} \sim p_\theta(y|z^{(0)})$. The conditional distribution can also be approximated by Equation (8).

$$p_{data}(y|x) \approx p_\theta(y|x) \quad (8)$$

$$= \int p_\theta(z|x)p_\theta(y|z)dz \approx \frac{1}{S}\sum_{s=1}^{S} p_\theta(y|z^{(s)}); $$

$$z^{(s)} \sim p_\theta(z|x)$$

In Equation (8), S is the number of samples taken for approximation. Hence, for a discrete random variable Y, an approximate maximum-a-posteriori (MAP) detection can be performed as Equation (9).

$$\hat{y}(x) = \underset{y}{\operatorname{argmax}} \frac{1}{S}\sum_{s=1}^{S} p_\theta(y|z^{(s)}); z^{(s)} \sim p_\theta(z|x) \quad (9)$$

Given the model posterior $p_\theta(z|x)$, an approximate inference of Y from X can be performed through $p_\theta(y|z)p_\theta(z|x)$ via the joint representation Z, and is referred to as stochastic inference via joint representation.

The model posterior $p_\theta(z|x)$ is intractable. Thus, a variational posterior (or a partial approximate posterior) $q_{\phi_x}(z|x)$ is generated and used. If $q_{\phi_x}(z|x)$ is close to $p_\theta(z|x)$, inference can be performed through $q_{\phi_x}(z|x)p_\theta(y|z)$ instead, which is referred to as a variational inference via joint representation.

At 404, the system trains the variational posterior. Training the variational posterior utilizes the concept that the variational learning is equivalent to matching joint distribution, as in Equation (10).

$$E_{p_{data}(x)}[\mathcal{L}(X;\theta,\phi_x)] = h(p_{data}(x)) + D(p_{data}(x)q_{\phi_x}(z|x)\| \\ p_\theta(z)p_\theta(x|z)) \quad (10)$$

If $p_\theta(z)p_\theta(x|z)$ is given such that $p_\theta(x) \approx p_{data}(x)$, then minimizing the objective would ensure that $q_{\phi_x}(z|x) \approx p_\theta(x|z)$. Thus, the full latent variable model $p_\theta(z)p_\theta(x|z)p_\theta(y|z)$ can be trained with the assistance of a variational posterior $q_{\phi_{x,y}}(z|x,y)$ to ensure that $p_\theta(x|z)$ and $p_\theta(y|z)$ are well-fitted to the joint distribution $p_{data}(x,y)$. Then, the variational posteriors $q_{\phi_x}(z|x)$ and/or $q_{\phi_y}(z|y)$, which can be used in inference.

The joint model and variational posteriors can be trained based on multiple algorithm. A first algorithm is a two-step training algorithm. The latent model $p_\theta(z)p_\theta(x|z)p_\theta(y|z)$ and variational encoder $q_{\phi_{x,y}}(z|x,y)$ can be trained by solving Equation (11).

$$\min_{\theta,\phi_{x,y}} D\big(p_{data}(x,y)q_{\phi_{x,y}}(z|x,y) \| p_\theta(z)p_\theta(x|z)p_\theta(y|z)\big) \quad (11)$$

Then, the variational encoder $q_{\phi_x}(z|x)$ can be trained by solving Equation (12).

$$\min_{\phi_x} D(p_{data}(x)q_{\phi_x}(z|x) \| p_\theta(z)p_\theta(x|z)) \quad (12)$$

In Equation (12), it is assumed that Equation (11) finds a good model likelihood $p_\theta(x|z)$ and $p_\theta(y|z)$, and the decoder parameter $\theta$ is frozen. The encoder based on Y can also be trained in Equation (12).

Alternatively, the joint model and the variational posterior can be trained simultaneously utilizing a hyperparameter $\alpha$ in a second algorithm. Given the hyperparameter $\alpha > 0$, the latent model $p_\theta(z)p_\theta(x|z)p_\theta(y|z)$ and variational encoders $q_{\phi_{x,y}}(z|x,y)$ and $q_{\phi_x}(z|x)$ (i.e., a marginal variational posterior) jointly by solving Equation (13).

$$\min_{\theta,\phi_{x,y},\phi_x} D\big(p_{data}(x,y)q_{\phi_{x,y}}(z|x,y) \| p_\theta(z)p_\theta(x|z)p_\theta(y|z)\big) + \quad (13)$$

$$\alpha D(p_{data}(x)q_{\phi_x}(z|x) \| p_\theta(z)p_\theta(x|z))$$

To train $q_{\phi_y}(z|y)$ (i.e., a marginal variational posterior) together, the objective can be set to Equation (14).

$$D(p_{data}(x, y)q_{\phi_{x,y}}(z|x, y) \| p_\theta(z)p_\theta(x|z)p_\theta(y|z)) + \quad (14)$$
$$\alpha_x D(p_{data}(x)q_{\phi_x}(z|x) \| p_\theta(z)p_\theta(x|z)) +$$
$$\alpha_y D(p_{data}(y)q_{\phi_y}(z|y) \| p_\theta(z)p_\theta(y|z))$$

The hyperparameters $\alpha_x$ and $\alpha_y$ are specified and are greater than 0.

The first algorithm has no hyperparameter to be tuned, thus it can be easily generalized to a multivariate model, whereas the number of hyperparameters in the second algorithm becomes larger for a multivariate model. However, the second algorithm becomes advantageous under a semi-supervised learning setting as there are only a few number of paired samples and comparably more unpaired samples as it can naturally incorporate the semi-supervised dataset.

At 406, the system performs inference. In general, it may be hard to train the latent variable model $p_\theta(z)p_\theta(x|z)p_\theta(y|z)$, as the decoders $p_\theta(x|z)$ and $p_\theta(y|z)$ need to extract the relevant information for generating X or Y from the joint representation Z. Therefore, the system may introduce randomness into the model in the form of local random variables $U_x$ and $U_y$ for each variable to allow some structural slackness to fit the desired information decomposition. By introducing the random variables, the latent variable model becomes $p_\theta(u_x,u_y,w)p_\theta(x|u_x,w)p_\theta(y|u_y,w)$, where X and Y are generated only from $(U_x, W)$ and $(U_y, W)$. To simplify notation, $z=(u_x,u_y,w)$, $z_x=(u_x,w)$ and $z_y=(u_y,w)$.

W plays a role as a common representation of X and Y, while the local randomness $U_x$ and $U_y$ captures the rest of the randomness. The model can be trained in the same manner as the model without randomness. The variational loss function is now given as Equation (15) and the corresponding risk is given as Equation (16).

$$\mathcal{L}(X, Y; \theta, \phi_{x,y}) := \quad (15)$$
$$D(q_{\phi_{x,y}}(z|x, y) \| p_\theta(z)) + \int q_{\phi_{x,y}}(z|x, y) \log \frac{1}{p_\theta(x|z_x)p_\theta(y|z_y)} dw$$

$$E[\mathcal{L}(X, Y; \theta, \phi)] = \quad (16)$$
$$h(X, Y) + D(p_{data}(x|y)q_{\phi_{x,y}}(z|x, y) \| p_\theta(z)p_\theta(x|z_x)p_\theta(y|z_y))$$

Inference may be performed by conditional generation, such that given $x^{(0)}$ the system would conditionally generate Y. If $q_{\phi_x}(u_x,w|x)$ is already trained, then a sample $(u_x^{(0)}, w^{(0)}) \sim q_{\phi_x}(u_x,w|x^{(0)})$ can be taken and Y can be generated as $Y \sim p_\theta(y|u_y^{(0)},w^{(0)})$ where $u_y^{(0)} \sim p_\theta(u_y)$.

Style generation may be performed as well. Given a paired data of (X, Y), where X is a digit image and Y is a label of the image. Y is almost determined by an image, and the local randomness $U_y$ can be generated. Given a reference image $x^{(0)}$, a set of images with the same style of $x^{(0)}$ with different labels can be generated. The style generation can be performed in three steps. First, the present system samples $(u_x,w) \sim q_{\phi_x}(u_x,w|x^{(0)})$ and stores $u_x^{(0)}=u_x$. Second, for each label y, the present system samples $(u_y,w) \sim q_{\phi_y}(u_y,w|y)$ and store $w(y)=w$. Third, the present system generates $\check{x}(y) \sim p_\theta(x|u_x^{(0)},w(y))$.

This procedure assumes that W solely represents the common information (e.g., the label information in this example), and the local random variables take all other attributes (randomness) excluding the common information (e.g., style of a digit). However, natively optimizing Equation (16) does not guarantee such information decomposition, as this objective only encourages matching joint distributions. For example, an extreme case where W contains all the information of both X and Y is still a possible solution.

Figure 5:
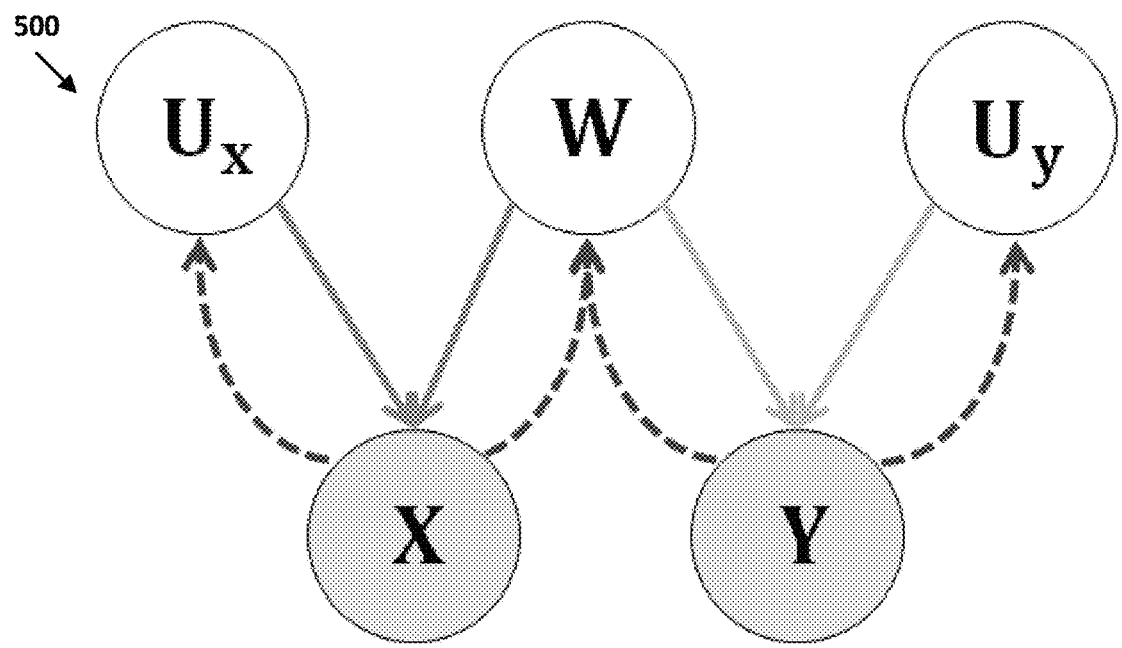
FIGS. 5 and 6 are diagrams of latent models with local randomness, according to an embodiment.
Figure 6:
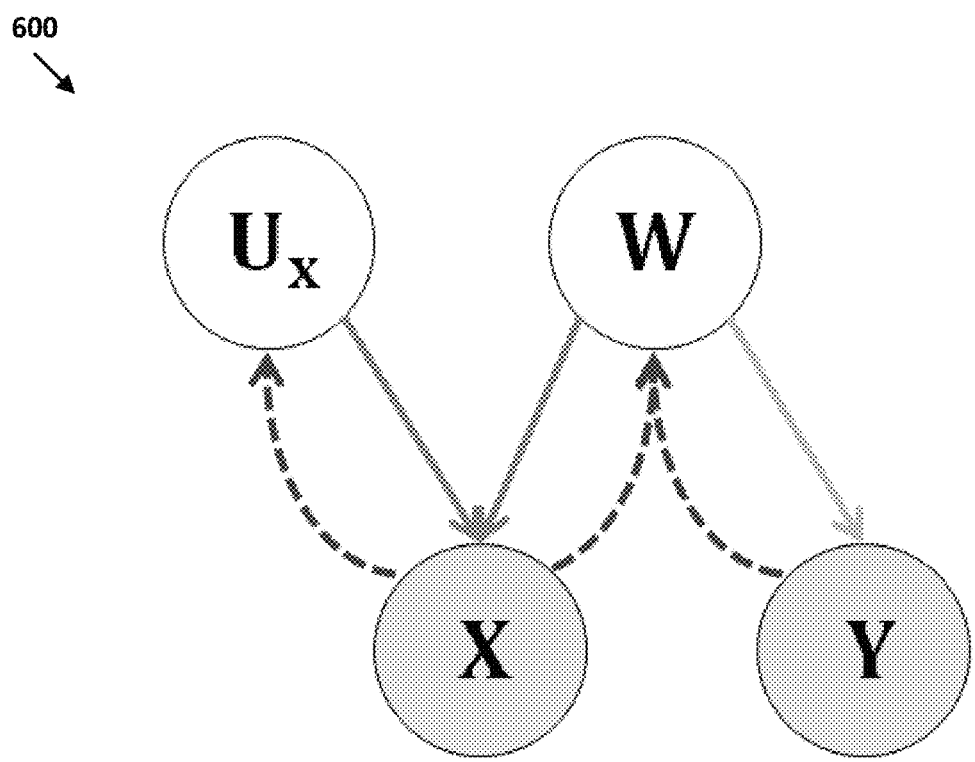

FIGS. 5 and 6 are diagrams of latent models with local randomness, according to an embodiment. Model 500 shows the base model, and model 600 shows the degenerated case when $H(Y|X) \approx 0$.

At 408, the system extracts common information. The extraction of common information may be performed during the inference step at 406. Common information extraction may be performed by adding the mutual information regularization term and optimizing the cost function as is described at Equation (20) below (i.e., training the joint model that optimizes Equation (20), which produces a model capable of extracting common information).

Wyner's common information represents the minimum description rate to simulate the distribution of two random variables. Given two random variables X and Y, the common information is given as Equation (17).

$$J(X; Y) := \min_{p(x|w),p(y|w):X-W-Y} I(X, Y; W) \quad (17)$$

X–W–Y forms a Markov chain. This can be interpreted as the minimum number of bits of information to be transmitted in common to each location to approximately simulate X and Y, respectively, while each location is allowed to use an arbitrary amount of local randomness.

Further, Equation (18) is not tractable in training.

$$I(X,Y;W) = D(p_\theta(w)p_\theta(x,y|w) \| p_\theta(x,y)p_\theta(w)) \quad (18)$$

Hence, a variational approximation as in Equation (19) is used.

$$I(X,Y;W) \approx D(p_{data}(x,y)q_\phi(w|x,y) \| p_{data}(x,y)p_\theta(w)) \quad (19)$$

Thus, the loss function for common information extraction by adding a regularization term $\lambda D(p_{data}(x,y)q_\phi(w|x,y) \| p_{data}(x,y)p_\theta(w))$ is given by Equation (20).

$$\min_{\theta,\phi} D(p_{data}(x, y)q_\phi(z|x, y) \| p_\theta(z)p_\theta(x|z_x)p_\theta(y|z_y)) + \quad (20)$$
$$\lambda D(p_{data}(x, y)q_\phi(w|x, y) \| p_{data}(x, y)p_\theta(w))$$

In Equation (20), $\lambda$ is a hyperparameter.

The systems and methods disclosed herein include processes/algorithms that may be integrated into electronic devices, networks, etc. The systems and methods may perform inference using an image capture device of an electronic device, and other practical applications that will be apparent to one of skill in the art, such as image captioning, image in-painting, image2image translation (e.g., horse to zebra), style transfer, text to speech, missing/future frame prediction in video.

Figure 7:
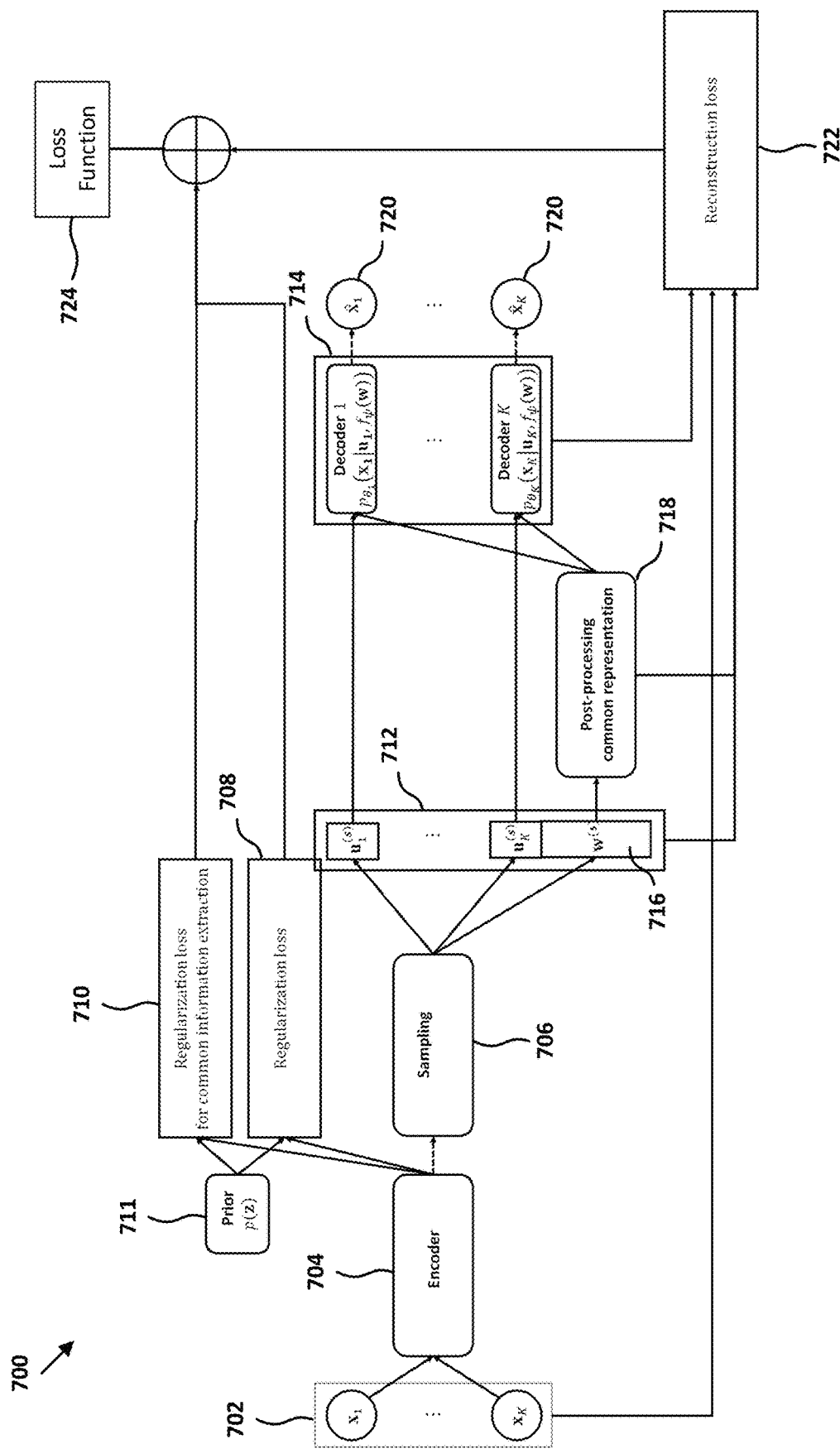
FIG. 7 is a diagram of a system, according to an embodiment.

FIG. 7 is a diagram of a system 700 in which the above described embodiments are integrated and implemented, according to an embodiment. In the system 700, inputs 702 are sent to an encoder 704 which processes the inputs as Equation (21) for sampling 706 as Equation (22).

$$q_{\phi_{[K]}}(z|x_{1:K}), z \triangleq (u_1, \ldots, u_K, w) \quad (21)$$

$$z^{(s)} \sim q_{\phi_{[K]}}(z|x_{1:K}), (s=1, \ldots, S) \quad (22)$$

The output of the encoder 704 is also sent to calculate the regularization loss 708 as in Equation (23) and the regularization loss for common information extraction 710 as in Equation (24).

$$D(q_{\phi_{[K]}}(z|x_{1:K})||p(z)) \tag{23}$$

$$D(q_{\phi_{[K]}}(w|x_{1:K})||p(w)) \tag{24}$$

The losses 708 and 710 are calculated with the prior p (z) distribution 711. The samples 712 are sent to decoders 714, while the common representation 716 is post processed 718 as in Equation (25) and also sent to decoders 714

$$p_{\theta_1}(x_1|u_1, f_\psi(w)) \ldots p_{\theta_K}(x_K|u_K, f_\psi(w)).$$

$$w \mapsto f_\psi(w) \tag{25}$$

The decoders 714 output the predictions 720. The reconstruction loss 722 is calculated based on the output of the decoders 714, the post processing of the common representation 718, the samples 712 and the inputs 702 as in Equation (26).

$$\sum_{s=1}^{S} \sum_{i=1}^{K} \log \frac{1}{p_\theta(x_i|u_i^{(s)}, f_\psi(w^{(s)}))} \tag{26}$$

The reconstruction loss 722 is combined with the regularization loss 708 and the regularization loss for common information extraction 710 to determine the loss function 724 as in Equation (27).

$$\text{(loss function)} = \mathcal{L}(x_{1:K}, \theta_{1:K}, \phi_{[K]}) = \tag{27}$$

$$D(q_{\phi_{[K]}}(z|x_{1:K}) || p(z)) + \lambda D(q_{\phi_{[K]}}(w|x_{1:K}) || p(w)) +$$

$$\int q_{\phi_{[K]}}(z|x_{1:K}) \sum_{i=1}^{K} \log \frac{1}{p_\theta(x_i|u_i, f_\psi(w))} dz \approx$$

$$D(q_{\phi_{[K]}}(z|x_{1:K}) || p(z)) + \lambda D(q_{\phi_{[K]}}(w|x_{1:K}) || p(w)) +$$

$$\sum_{s=1}^{S} \sum_{i=1}^{K} \log \frac{1}{p_\theta(x_i|u_i^{(s)}, f_\psi(w^{(s)}))},$$

$$z^{(s)} \sim q_{\phi_{[K]}}(z|x_{1:K})$$

where $x_{1:K} \triangleq (x_1, \ldots, x_K)$, and $[K] \triangleq \{1, \ldots, K\}$. Further, each parameter $\theta_1, \ldots, \theta_K, \phi_{[K]}$ represents a different network, and $z \triangleq (u_1, \ldots, u_K, w)$.

Figure 8:
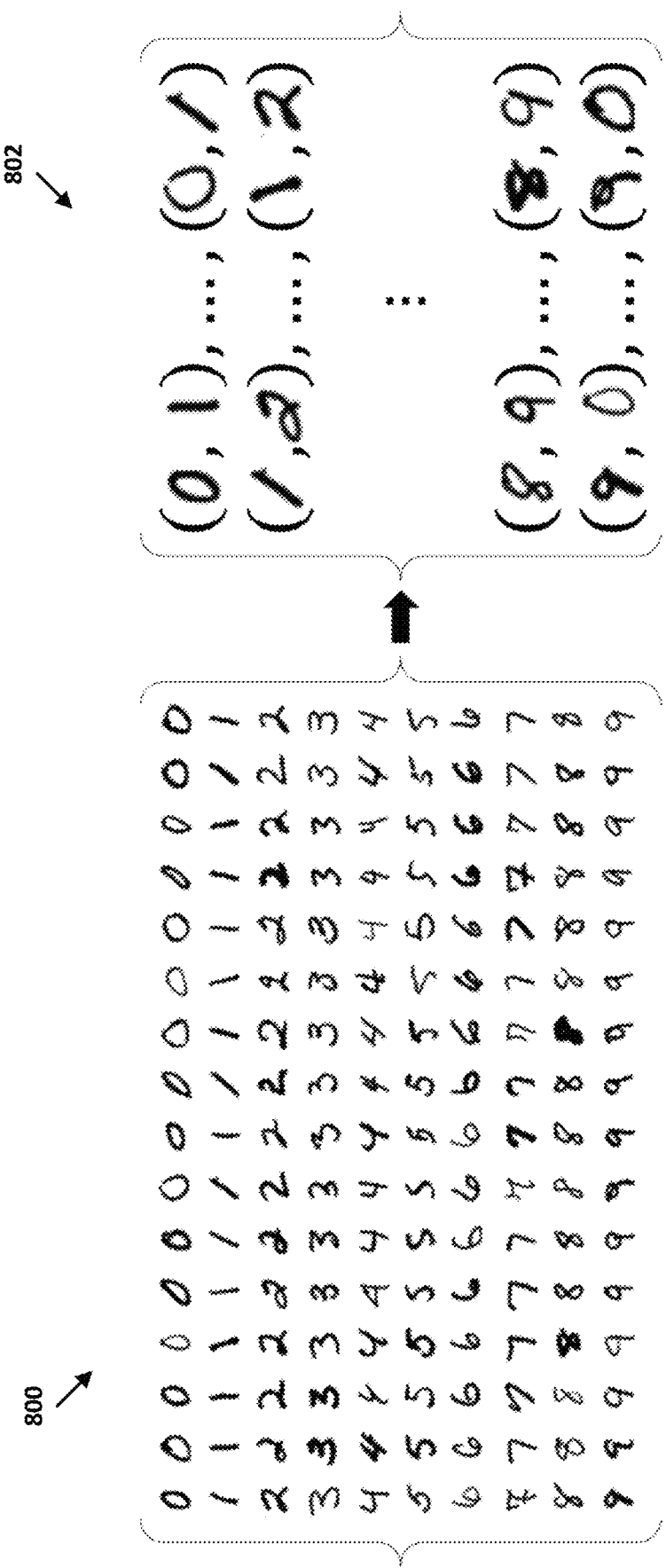
FIG. 8 is a diagram of a dataset and data pairs, according to an embodiment.

FIG. 8 is a diagram of a data set and data pairs used in an add-one experiment, according to an embodiment. The dataset 800 is a MNIST (Modified National Institute of Standards and Technology) dataset of handwritten digits, and the add-one data set pairs 802 are extracted from the dataset 800.

Figure 9:
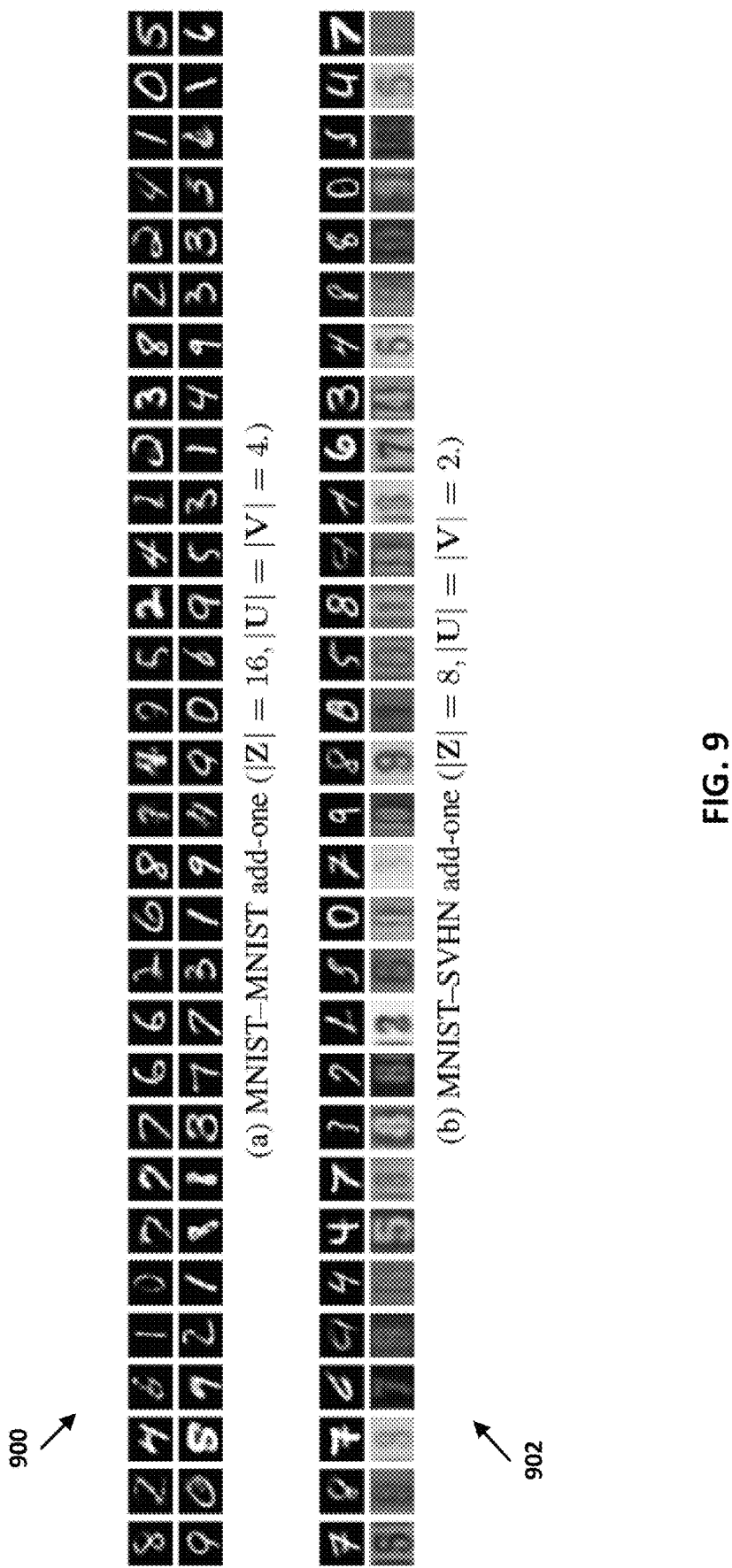
FIG. 9 is a diagram of joint generation results, according to an embodiment.

In FIGS. 9-13 below, |Z| represents a dim of a common variable, while |U| and |V| represent dims of local variables. FIG. 9 is a diagram of joint generation results, according to an embodiment. The results of 900 are from a MNIST-MNIST add-one experiment where |Z|=16 and |U|=|V|=4. The results of 902 are from a MNIST-SVHN (street view house numbers) add-one experiment where |Z|=8 and |U|=|V|=2.

Figure 10:
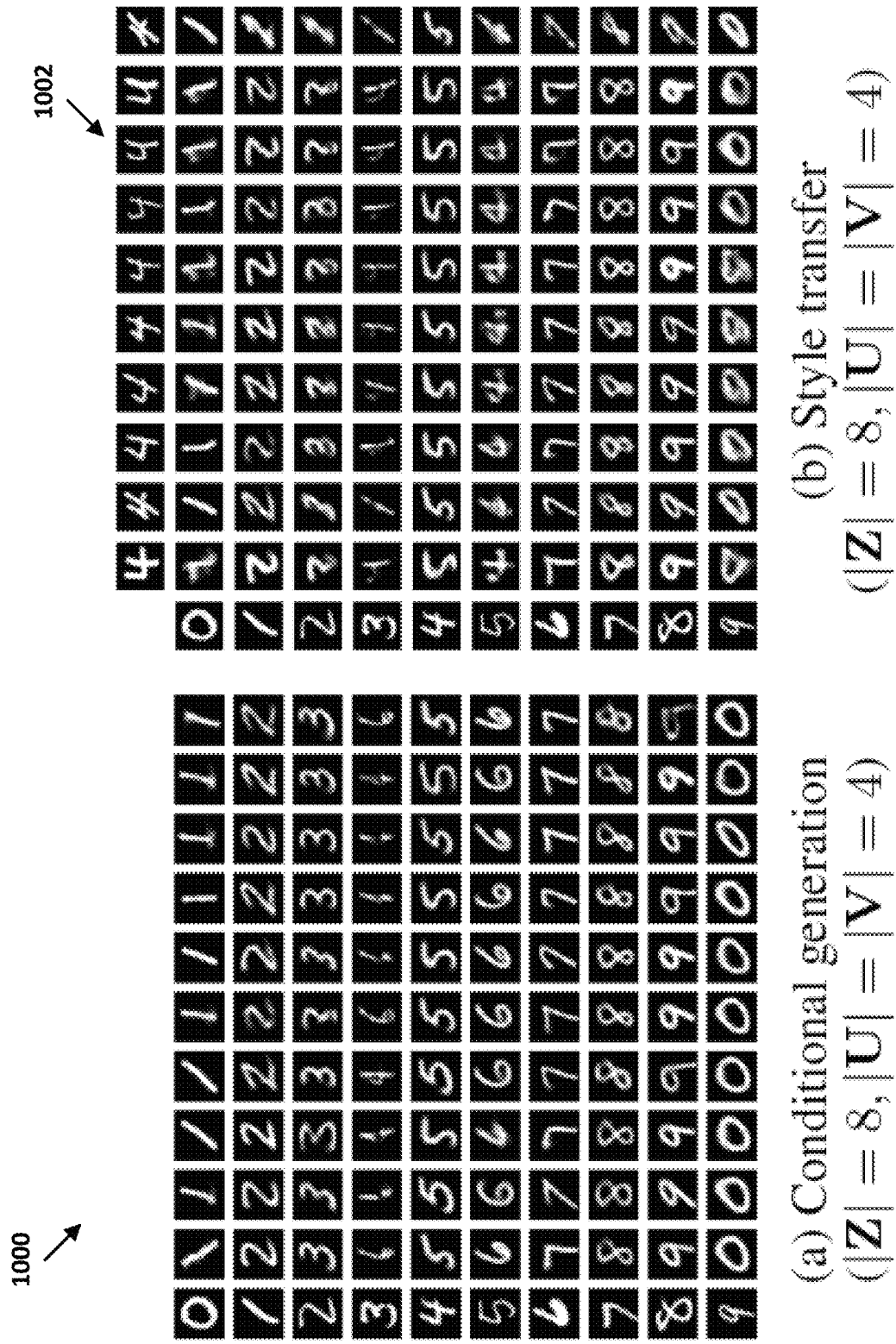
FIGS. 10, 11, 12 and 13 are diagrams of conditional generation and style transfer results, according to an embodiment.

FIG. 10 is a diagram of conditional generation and style transfer results, according to an embodiment. The results of 1000 are from a MNIST-MNIST add-one experiment for conditional generation where |Z|=8 and |U|=|V|=4. The results of 1002 are from a MNIST-MNIST add-one experiment for style transfer where |Z|=8 and |U|=|V|=4.

Figure 11:
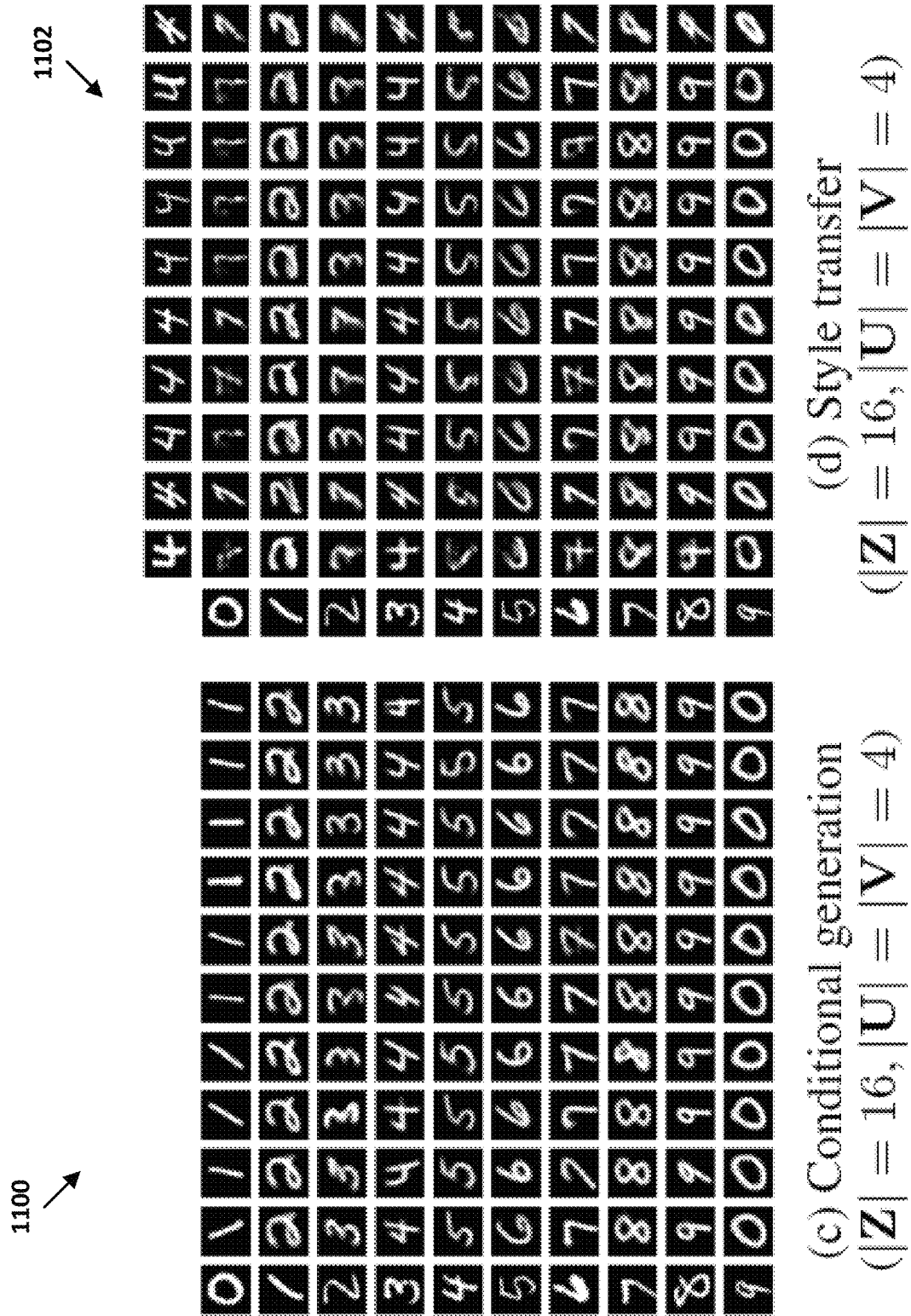

FIG. 11 is a diagram of conditional generation and style transfer results, according to an embodiment. The results of 1100 are from a MNIST-MNIST add-one experiment for conditional generation where |Z|=16 and |U|=|V|=4. The results of 1102 are from a MNIST-MNIST add-one experiment for style transfer where |Z|=16 and |U|=|V|=4.

Figure 12:
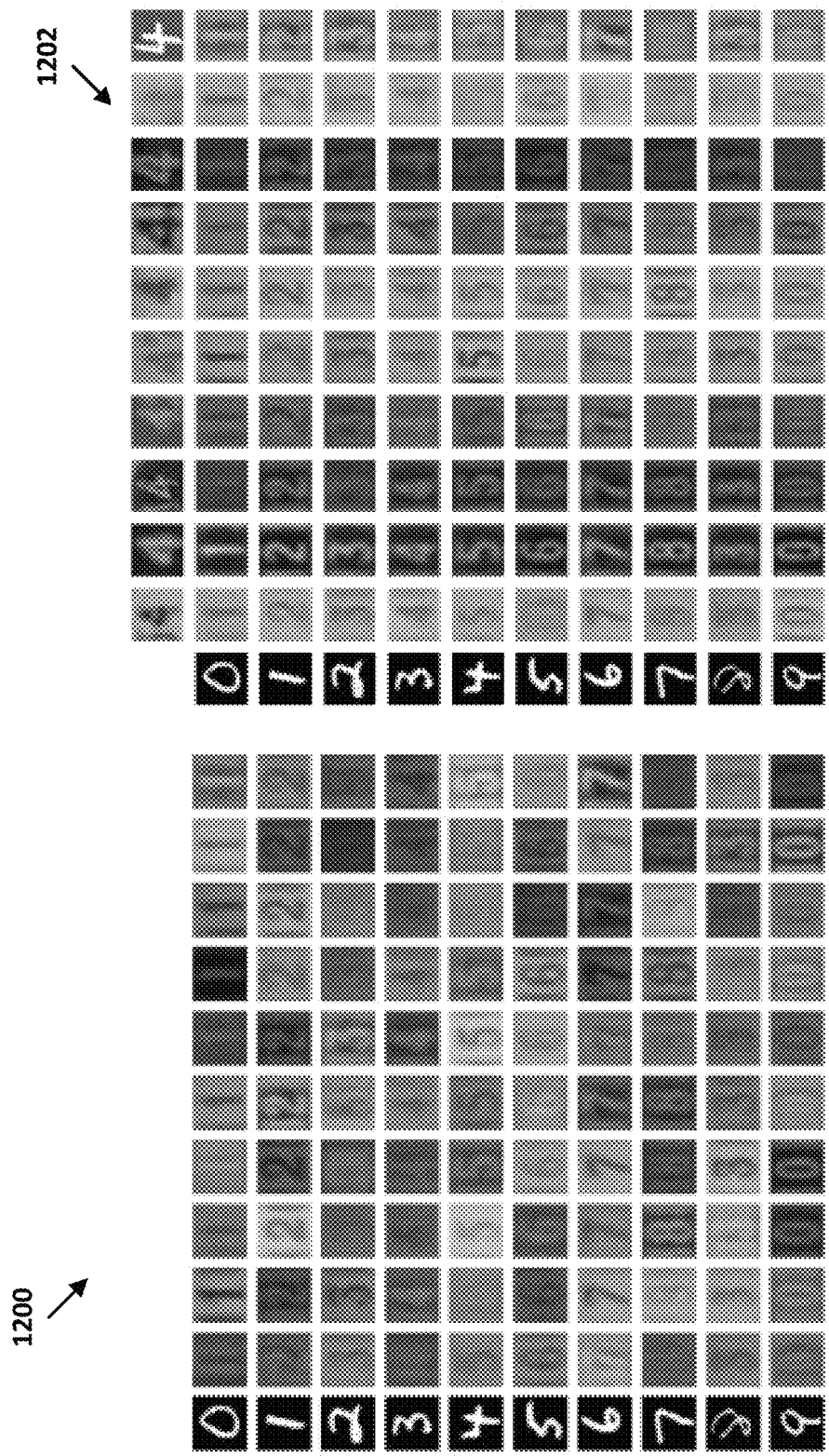

FIG. 12 is a diagram of conditional generation and style transfer results, according to an embodiment. The results of 1200 are from a MNIST-SVHN add-one experiment for conditional generation where |Z|=8 and |U|=|V|=2. The results of 1202 are from a MNIST-SVHN add-one experiment for style transfer where |Z|=8 and |U|=|V|=2.

Figure 13:
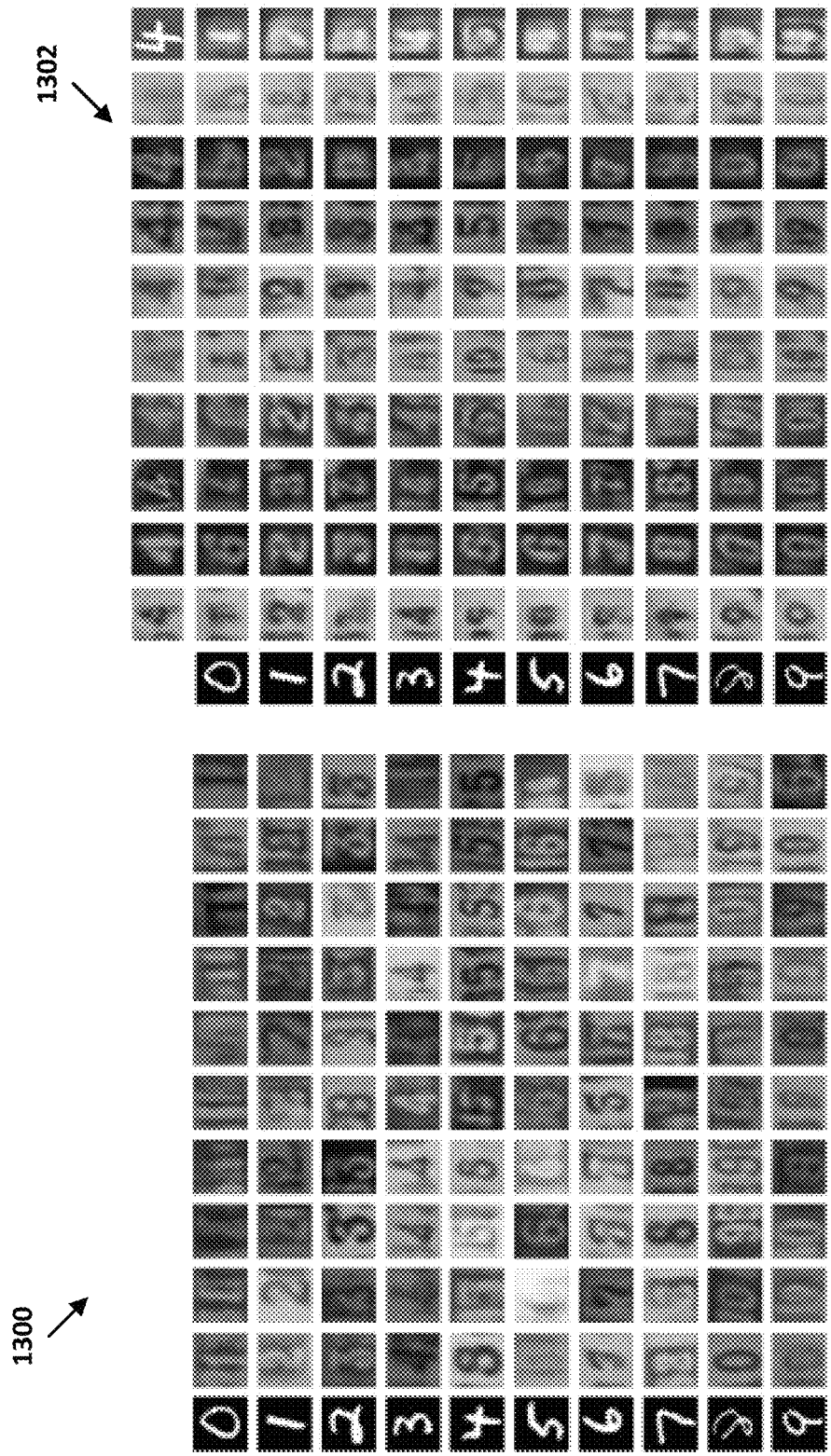

FIG. 13 is a diagram of conditional generation and style transfer results, according to an embodiment. The results of 1300 are from a MNIST-SVHN add-one experiment for conditional generation where |Z|=8 and |U|=|V|=16. The results of 1302 are from a MNIST-SVHN add-one experiment for style transfer where |Z|=8 and |U|=|V|=16

Figure 14:
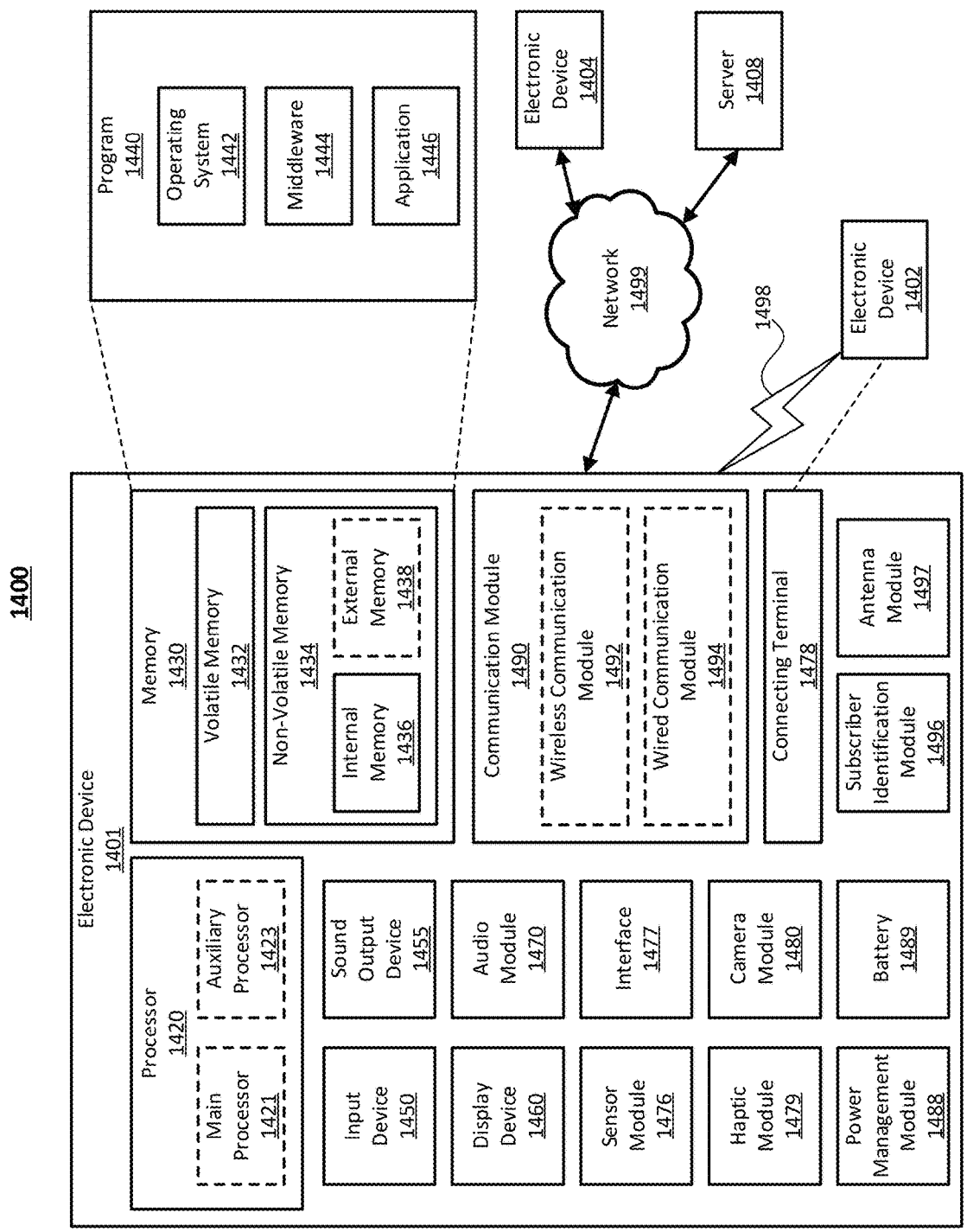
FIG. 14 is a block diagram of an electronic device in a network environment, according to one embodiment.

FIG. 14 is a block diagram of an electronic device 1401 in a network environment 1400, according to one embodiment. Referring to FIG. 14, the electronic device 1401 in the network environment 1400 may communicate with an electronic device 1402 via a first network 1498 (e.g., a short-range wireless communication network), or an electronic device 1404 or a server 1408 via a second network 1499 (e.g., a long-range wireless communication network). The electronic device 1401 may communicate with the electronic device 1404 via the server 1408. The electronic device 1401 may include a processor 1420, a memory 1430, an input device 1450, a sound output device 1455, a display device 1460, an audio module 1470, a sensor module 1476, an interface 1477, a haptic module 1479, a camera module 1480, a power management module 1488, a battery 1489, a communication module 1490, a subscriber identification module (SIM) 1496, or an antenna module 1497. In one embodiment, at least one (e.g., the display device 1460 or the camera module 1480) of the components may be omitted from the electronic device 1401, or one or more other components may be added to the electronic device 1401. In one embodiment, some of the components may be implemented as a single integrated circuit (IC). For example, the sensor module 1476 (e.g., a fingerprint sensor, an iris sensor, or an illuminance sensor) may be embedded in the display device 1460 (e.g., a display).

The processor 1420 may execute, for example, software (e.g., a program 1440) to control at least one other component (e.g., a hardware or a software component) of the electronic device 1401 coupled with the processor 1420, and may perform various data processing or computations. As at least part of the data processing or computations, the processor 1420 may load a command or data received from another component (e.g., the sensor module 1476 or the communication module 1490) in volatile memory 1432, process the command or the data stored in the volatile memory 1432, and store resulting data in non-volatile memory 1434. The processor 1420 may include a main processor 1421 (e.g., a central processing unit (CPU) or an application processor (AP)), and an auxiliary processor 1423 (e.g., a graphics processing unit (GPU), an image signal processor (ISP), a sensor hub processor, or a communication processor (CP)) that is operable independently from, or in conjunction with, the main processor 1421. Additionally or alternatively, the auxiliary processor 1423 may be adapted to consume less power than the main processor 1421, or execute a particular function. The auxiliary processor 1423 may be implemented as being separate from, or a part of, the main processor 1421.

The auxiliary processor 1423 may control at least some of the functions or states related to at least one component (e.g., the display device 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to one embodiment, the auxiliary processor 1423 (e.g., an image signal processor or a communication processor) may be implemented as part of another component (e.g., the camera module 1480 or the communication module 1490) functionally related to the auxiliary processor 1423.

The memory 1430 may store various data used by at least one component (e.g., the processor 1420 or the sensor module 1476) of the electronic device 1401. The various data may include, for example, software (e.g., the program 1440) and input data or output data for a command related thererto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input device 1450 may receive a command or data to be used by other component (e.g., the processor 1420) of the electronic device 1401, from the outside (e.g., a user) of the electronic device 1401. The input device 1450 may include, for example, a microphone, a mouse, or a keyboard.

The sound output device 1455 may output sound signals to the outside of the electronic device 1401. The sound output device 1455 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1460 may visually provide information to the outside (e.g., a user) of the electronic device 1401. The display device 1460 may include, for example, a display, a hologram device, or a projector and control circuitry to control a corresponding one of the display, hologram device, and projector. According to one embodiment, the display device 1460 may include touch circuitry adapted to detect a touch, or sensor circuitry (e.g., a pressure sensor) adapted to measure the intensity of force incurred by the touch.

The audio module 1470 may convert a sound into an electrical signal and vice versa. According to one embodiment, the audio module 1470 may obtain the sound via the input device 1450, or output the sound via the sound output device 1455 or a headphone of an external electronic device 1402 directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. The sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device 1402 directly (e.g., wiredly) or wirelessly. According to one embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device 1402. According to one embodiment, the connecting terminal 1478 may include, for example, an HDMI connector, a USB connector, an SD card connector, or an audio connector (e.g., a headphone connector).

The haptic module 1479 may convert an electrical signal into a mechanical stimulus (e.g., a vibration or a movement) or an electrical stimulus which may be recognized by a user via tactile sensation or kinesthetic sensation. According to one embodiment, the haptic module 1479 may include, for example, a motor, a piezoelectric element, or an electrical stimulator.

The camera module 1480 may capture a still image or moving images. According to one embodiment, the camera module 1480 may include one or more lenses, image sensors, image signal processors, or flashes.

The power management module 1488 may manage power supplied to the electronic device 1401. The power management module 1488 may be implemented as at least part of, for example, a power management integrated circuit (PMIC).

The battery 1489 may supply power to at least one component of the electronic device 1401. According to one embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the AP) and supports a direct (e.g., wired) communication or a wireless communication. According to one embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or a standard of the Infrared Data Association (IrDA)) or the second network 1499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The antenna module 1497 may transmit or receive a signal or power to or from the outside (e.g., the external electronic device) of the electronic device 1401. According to one embodiment, the antenna module 1497 may include one or more antennas, and, therefrom, at least one antenna appropriate for a communication scheme used in the communication network, such as the first network 1498 or the second network 1499, may be selected, for example, by the communication module 1490 (e.g., the wireless communication module 1492). The signal or the power may then be transmitted or received between the communication module 1490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1401 and the external electronic device 1404 via the server 1408 coupled with the second network 1499. Each of the electronic devices 1402 and 1404 may be a device of a same type as, or a different type, from the electronic device 1401. All or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, or client-server computing technology may be used, for example.

One embodiment may be implemented as software (e.g., the program 1440) including one or more instructions that are stored in a storage medium (e.g., internal memory 1436 or external memory 1438) that is readable by a machine (e.g., the electronic device 1401). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
 developing a joint latent variable model $p_\theta(z)p_\theta(x|z)p_\theta(y|z)$ having a first variable X, a second variable Y, and a joint latent variable Z representing common information between the first and second variables,
  wherein x and y represent paired data elements and θ denotes a parameter of an underlying latent model,
  wherein z is a data element,
  wherein $p_\theta(z)$ is a prior distribution,
  wherein $p_\theta(x|z)$ and $p_\theta(y|z)$ are model likelihoods,
  wherein the joint latent variable Z includes an amount information of both X and Y to satisfy a conditional independence $X \perp\!\!\!\perp Y|Z$,
  wherein X represents $P_{data}(x)$ Y represents $P_{data}(y)$, and
  wherein $P_{data}(x)$, and $P_{data}(y)$ are data distributions;
 generating a variational posterior of the joint latent variable model;
 training the variational posterior;
 performing inference of the first variable from the second variable based on the variational posterior, wherein performing the inference comprises conditionally generating the first variable from the second variable; and extracting common information between the first variable and the second variable, wherein extracting the common information comprises adding a regularization term $\lambda D(p_{data}(x,y)q_\phi(w|x,y)\|p_{data}(x,y)p_\theta(w))$ to a loss function $$\min_{\theta,\phi} D(p_{data}(x, y)q_\phi(z | x, y)\|p_\theta(z)p_\theta(x | z_x)p_\theta(y | z_y)).$$

2. The method of claim 1, further comprising adding local randomness to the joint latent variable model.

3. The method of claim 2, wherein adding the local randomness comprises separating the joint latent variable into a common latent variable and a local latent variable.

4. The method of claim 2, wherein performing the inference comprises generating a style for the first variable or the second variable.

5. The method of claim 1, wherein training the variational posterior comprises training a decoder in the joint latent variable model with a full approximate posterior of the joint latent variable model.

6. The method of claim 5, wherein training the variational posterior further comprises fixing parameters of the decoder and training a marginal variational posterior with the trained decoder.

7. The method of claim 1, wherein training the variational posterior comprises training the joint latent variable model, a full approximate posterior, and a marginal variational posterior jointly using a hyperparameter.

8. A system, comprising:
at least one decoder;
at least one encoder; and
a processor configured to:
develop a joint latent variable model $p_\theta(z)$ and $p_\theta(x|z)$ $p_\theta(y|z)$ having a first variable X, a second variable Y, and a joint latent variable Z representing common information between the first and second variables,
wherein x and y represent paired data elements and $\theta$ denotes a parameter of an underlying latent model,
wherein z is a data element,
wherein $p_\theta(z)$ is a prior distribution,
wherein $p_\theta(x|z)$ and $p_\theta(y|z)$ are model likelihoods,
wherein the joint latent variable Z includes an amount information of both X and Y to satisfy a conditional independence $X \perp Y|Z$,
wherein X represents $P_{data}(x)$ and Y represents $P_{data}(y)$, and
wherein $P_{data}(x)$, and $P_{data}(y)$ are data distributions;
generate a variational posterior of the joint latent variable model;
train the variational posterior; and
perform inference of the first variable from the second variable based on the variational posterior, by conditionally generating the first variable from the second variable; and
extract common information between the first variable and the second variable, by adding a regularization term $\lambda D(p_{data}(x,y)q_\phi(w|x,y)\|p_{data}(x,y)p_\theta(w))$ to a loss function $$\min_{\theta,\phi} D(p_{data}(x, y)q_\phi(z | x, y)\|p_\theta(z)p_\theta(x | z_x)p_\theta(y | z_y)).$$

9. The system of claim 8, wherein the processor is further configured to add local randomness to the joint latent variable model.

10. The system of claim 9, wherein the processor is further configured to add the local randomness by separating the joint latent variable into a common latent variable and a local latent variable.

11. The system of claim 9, wherein the processor is further configured to perform the inference by generating a style for the first variable or the second variable.

12. The system of claim 8, wherein the processor is further configured to train the variational posterior by training the at least one decoder in the joint latent variable model with a full approximate posterior of the joint latent variable model.

13. The system of claim 12, wherein the processor is further configured to train the variational posterior by fixing parameters of the at least one decoder and training a marginal variational posterior with the trained at least one decoder.

14. The system of claim 8, wherein the processor is further configured to train the variational posterior by training the joint latent variable model, a full approximate posterior, and a marginal variational posterior jointly using a hyperparameter.

\* \* \* \* \*

UNITED STATES PATENT AND TRADEMARK OFFICE
CERTIFICATE OF CORRECTION

PATENT NO.           : 11,620,555 B2                                    Page 1 of 1
APPLICATION NO.      : 16/373913
DATED                : April 4, 2023
INVENTOR(S)          : Jongha Ryu et al.

It is certified that error appears in the above-identified patent and that said Letters Patent is hereby corrected as shown below:

In the Claims

In Column 15, Line 35, in Claim 8:
"develop a joint latent variable model $p_\theta(z)$ and $p_\theta(x|z)$"
Should be:
-- develop a joint latent variable model $p_\theta(z)p_\theta(x|z)$ --

Signed and Sealed this
Second Day of January, 2024

Katherine Kelly Vidal
*Director of the United States Patent and Trademark Office*